United States Patent [19]
Frederick et al.

[11] 3,813,201
[45] May 28, 1974

[54] SHOE MOLDS

[75] Inventors: Eugene G. Frederick; Albert I. Morse, Beverly; Robert C. Simmonds, Jr., Topsfield, all of Mass.

[73] Assignee: USM Corporation, Fleming, N.J.

[22] Filed: May 1, 1972

[21] Appl. No.: 249,130

[52] U.S. Cl............ 425/242, 249/141, 249/105, 249/134, 425/119, 425/DIG. 44, 425/812, 425/129 S
[51] Int. Cl............................................ B29f 1/06
[58] Field of Search ............ 425/110, 119, 90, 129, 425/812, DIG. 44, 242; 249/183, 105, 134

[56] References Cited
UNITED STATES PATENTS

| | | | |
|---|---|---|---|
| 2,976,571 | 3/1961 | Moslo | 249/141 |
| 2,994,920 | 8/1961 | Patera | 249/105 |
| 3,108,339 | 10/1963 | Bucy | 425/812 |
| 3,158,906 | 12/1964 | Boyer | 425/DIG. 44 |
| 3,298,069 | 1/1967 | Tencate | 425/DIG. 44 |
| 3,299,476 | 1/1967 | McIlvin | 425/129 S UX |
| 3,344,477 | 10/1967 | Stokis | 425/812 X |
| 3,374,983 | 3/1968 | Garretson et al. | 425/812 X |
| 3,377,662 | 4/1968 | Fukushima | 425/812 X |
| 3,403,423 | 10/1968 | McMorrow et al. | 425/DIG. 44 |
| 3,474,496 | 10/1969 | Klee | 425/119 |
| 3,539,144 | 10/1970 | Krug | 249/134 X |
| 3,648,965 | 3/1972 | Daddona | 249/134 |
| 3,671,621 | 6/1972 | Fukuoka | 425/129 S X |

*Primary Examiner*—J. Howard Flint, Jr.
*Attorney, Agent, or Firm*—Aubrey C. Brine; Vincent A. White; Richard B. Megley

[57] ABSTRACT

A mold for forming an article having a complex shape such as the unitary sole and heel tread member of a woman's shoe and the method of making same wherein the article to be cast is of a material which is injected into said mold in a liquid form. The mold for such articles is formed of first and second mold members defining a molding cavity therein, and at least one of the mold members in the cavity region has a portion which is formed of a heat-resistant rubbery elastic material such as silicone rubber. When the members are operatively assembled together for molding and one of the mold members may be adapted with a sprue for filling said cavity with the material for casting and conduit means disposed in at least one of said mold members extending from the opening in said cavity region through the mold member to the outside thereof. In preferred embodiments, said conduit means is adapted to be coupled to pressurized, fluid supply means.

7 Claims, 6 Drawing Figures

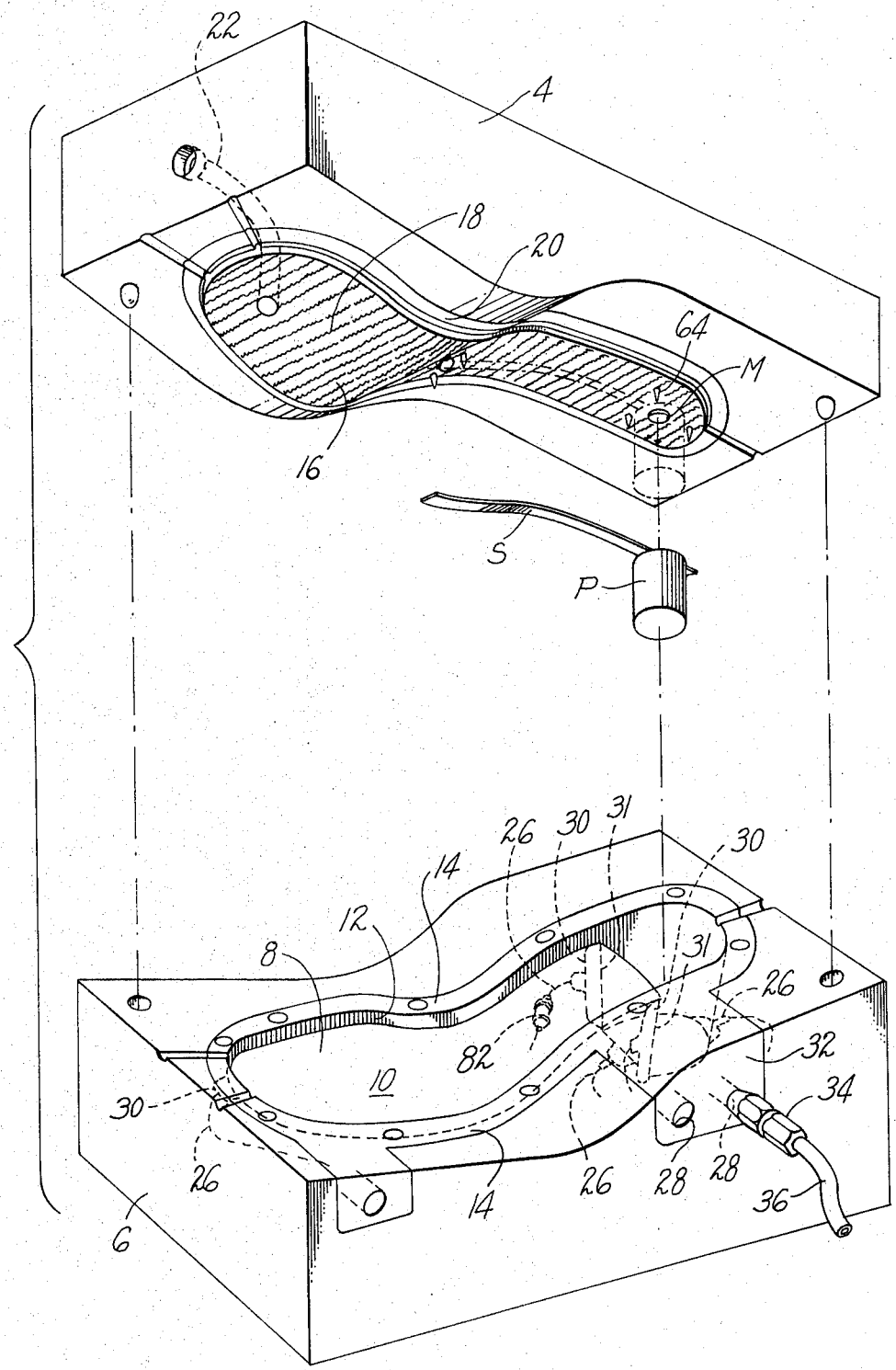

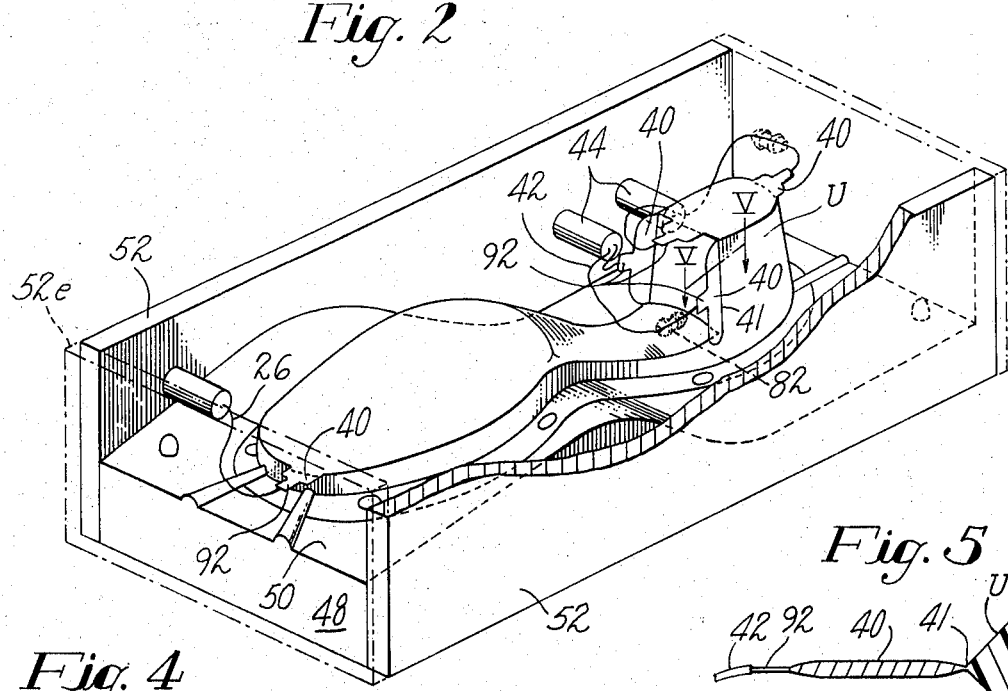
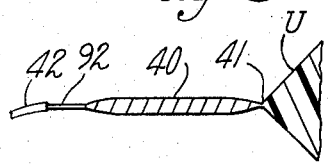
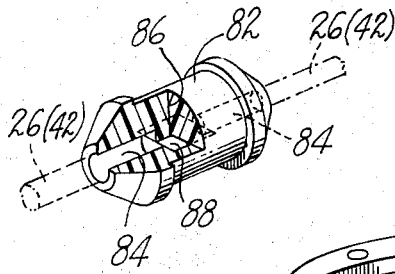
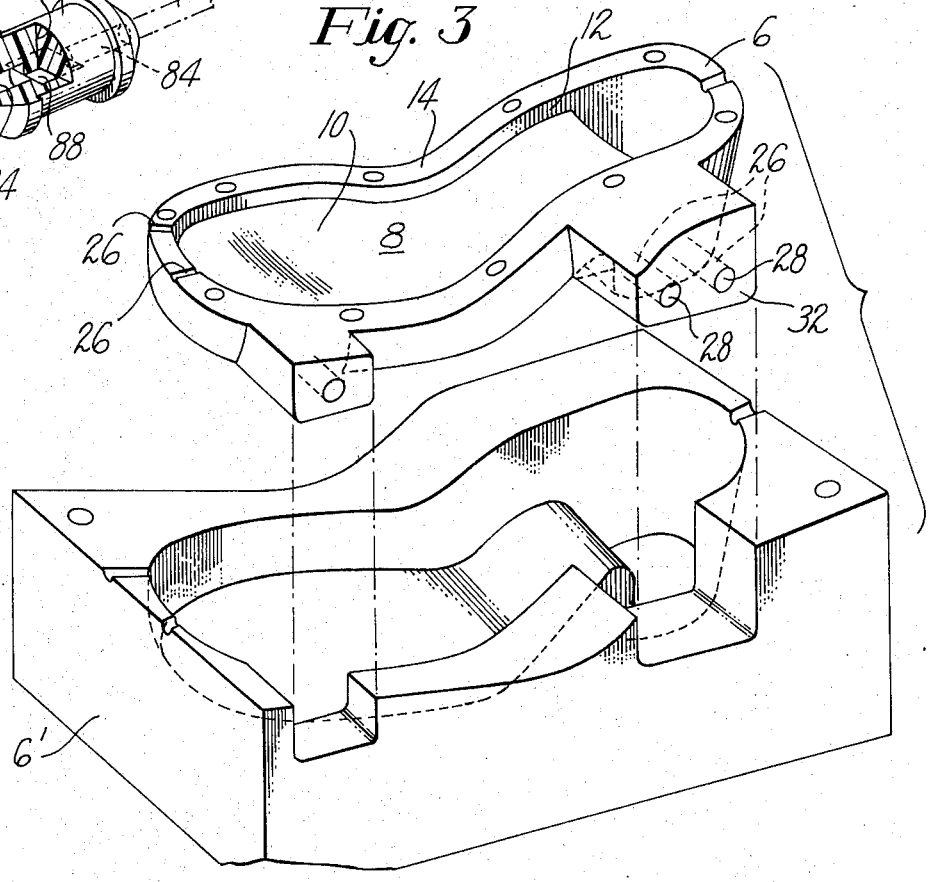

SHOE MOLDS

BACKGROUND OF THE INVENTION

The art of shoemaking has advanced from the traditional shoe being built up on a last by the shoemaker craftsman to the stage where the article may be of "man-made" materials, i.e., plastics, and built up through one or more injection molding cycles. There have also been significant styling changes which have caused the shoemaking industry to be faced with totally new and markedly different requirements in shoe construction and in the apparatus for making same. The utilization of such materials as polyvinyl chloride are well known as substitutes for leather in upper materials. Likewise, the poromeric materials such as available under trade names Corfam and Aztran have also emerged as leather substitutes for shoe upper materials.

Various other articles of footwear departing from the traditional constructions have been made in recent years. Among these are the slush-molded articles of a unitary construction wherein the shoe sole or tread member and upper are molded in a continuing operation. One or more materials may be used in such construction and the unitary article may be the product of several successive molding steps within a single mold. Quite often, overshoes, boots and the like are manufactured by this process.

With the various new materials and construction techniques available there has been a continued demand for further new types of footwear construction, employing both the previously known materials as well as the newer materials that are continually being developed. Current demands include a shoe at least resembling the traditional built-up article, however being made by high-volume, low-cost modern techniques. This demand has generated an even greater need for a unitary sole/heel tread combination upon which a shoe upper may be attached. Likewise, there is a growing requirement in the industry to utilize low cost moldable plastics such as polyurethane because of light weight, its wear characteristics, and style freedom.

The production of unitary sole and heel tread member components of polyurethane has presented significant problems to the existing art of molds for molding of plastic materials. In one method the molding material is poured into a mold and the mold closed and the material cured therein. In an alternative method polyurethane is injected into a closed mold and expanded therein in the molding process to make shoe components. Concurrent with the fill and/or growth of the material, the air entrapped in the cavity must be vented from the mold cavity. At the same time extreme care must be exercised in the mold design to insure that air is not entrapped within certain areas of the mold, preventing the total filling of the mold cavity during either the fill or fill and foam growth process. Thus, means for venting the mold cavity of such entrapped air must be provided; however, known venting means often create greater problems than they solve. Specifically, vent pores often become clogged with molding material or leave undesirable flash on the molded article.

When the polyurethane molded article is cast in a closed cavity, the mold must be capable of being disassembled for the removal of the cast article. There exists a requirement that the parting line at which these mold components join must be capable of generating a tight seal such that the molded article retains no vestiges of the juncture of the mold components. Traditional metal molds of aluminum, steel or other alloys thereof present significant problems in this area. One embodiment of the disclosed invention overcomes such problems.

A third problem area that exists in the molding plastic articles and particularly those of polyurethane foam or similar materials is that the final article cast remains fairly supple at the elevated molding temperatures. It is not until the article has cooled essentially to room temperature that it becomes firm for easy handling or has shrunk sufficiently during cooling such that the side walls of the formed article separate readily from the side walls of the mold cavity. Extraction of the molded article from the cavity remains one of the more persistent problems in the molding of plastic articles such as of polyurethane.

Superimposed over the above problems in development of molding apparatus for the footwear industry is the additional consideration that particular shoe forms (styles) are subject to abrupt, frequent changes. This fact imposes the requirement that any mold form, in order to be commercially successful, must be of comparatively low cost. While metallic molds are well known as reliable, long lasting and readily provided with vents, sprue holes and known ejection means for the molded article, they are also known for their high cost in material and manufacture. Particularly in the instance of unpredictable style changes in women's shoes and the resultant abrupt obsolescence of a particular mold shape, the longevity of the metallic mold is not necessarily a desirable characteristic. A mold manufacturer, supplier or user might easily become overburdened with a large inventory of serviceable but outdated mold forms. So overriding a factor is this that recourse to less expensive, readily workable mold materials is sought, albeit unconventional and untried, and perhaps less long-wearing, from the conventional types of molds of polyurethane foams for footwear. One embodiment of the disclosed invention is directed to the solution of this problem.

Accordingly, incorporation of the various elements of the invention hereinafter described has enabled the production of a particularly effective, low-cost mold for casting articles of plastics such as tread members of polyurethane foam, wherein the mold embodies particularly effective venting means and may be composed of material not previously considered suitable for such purpose.

SUMMARY OF THE INVENTION

The overall objects of the invention include providing a mold adapted for forming an article wherein the article is of a material which is introduced into said mold such as in liquid form (such as polyurethane).

To these ends, and in accordance with certain features of the invention, said mold includes first and second mold members forming a molding cavity therein, one of which is adapted with means for filling said cavity with molding material, at least one of said mold members in a portion of the cavity region thereof being formed of a heat resistant resilient material. Conduit means is disposed in said mold member having the cavity region of resilient material, the conduit means extending from an opening into said cavity region through said member to the outside thereof and adapted to be coupled to pressurized fluid supply means.

DESCRIPTION OF THE DRAWINGS

FIG. 1 is an exploded pictorial view, angularly inclined to show the inner details of the mold members of the invention.

FIG. 2 is a pictorial view partially in section illustrating manufacture of the mold member of the invention.

FIG. 3 is an exploded pictorial view of one of the mold members of FIG. 1.

FIG. 4 is a pictorial view partially in section of a flow restriction used in the mold of the invention.

FIG. 5 is a partial sectional view of the mold member of FIG. 2.

DESCRIPTION OF THE PREFERRED EMBODIMENT

Figure 6:
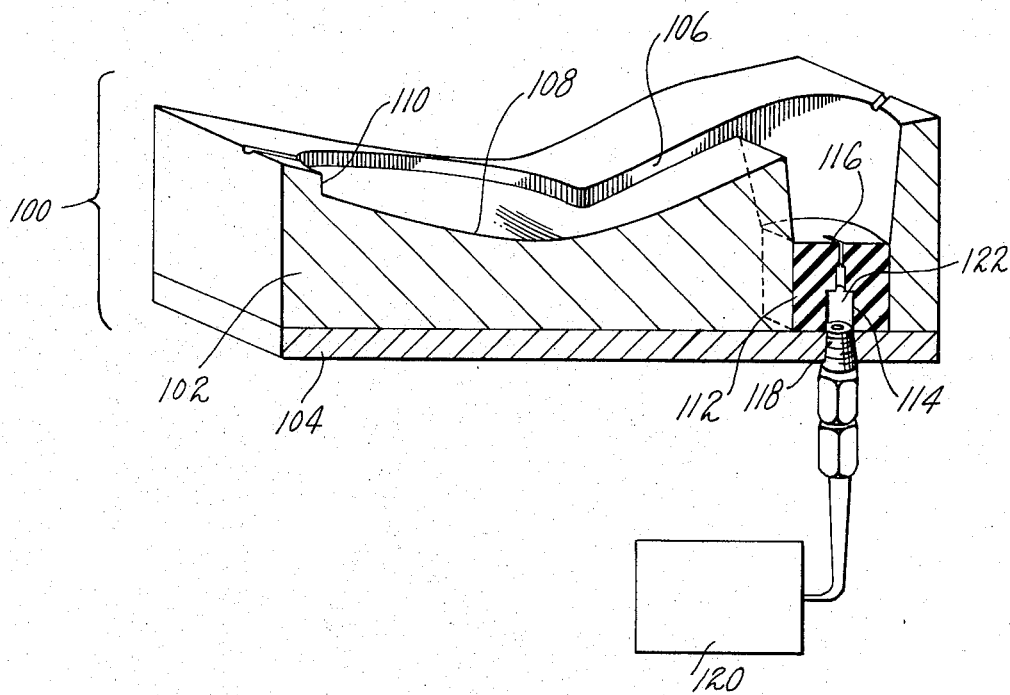
FIG. 6 is a pictorial view partially in section of an alternative embodiment of the invention.

Referring now to the drawings in general and to FIG. 1 in particular, there is shown a mold assembly having a top mold member 4 and a bottom mold member 6. In the illustrated embodiment member 6 contains a molding cavity 8 generally defining the desired shape of the article to be formed, e.g., a unitary sole and heel tread member.

The mold embodying our invention is particularly adapted for forming tread members (a unitary sole and heel for footwear) of polyurethane material injected into cavity 8 and foamed therein. As presently described, one of the mold members in this illustrated embodiment is (in the cavity region) entirely formed of a resilient material. This preferred illustration should in no way be considered a limitation of the claimed invention to such structure. As will be subsequently described, the invention may be adapted to all metal molds with significant improvement in their performance over known molds. Further, the molding material cast in the illustrative embodiment is described as polyurethane foam since its molding creates more and greater problems in mold structure than non-foamed materials. As with metal molds, the invention also provides significant advantages in use of non-foamable material over conventional molds. The tread member is cast in the mold, solidified and removed from the mold, whereupon it may be coated with an adhesive as disclosed in Hovey U.S. Pat. application Ser. No. 35,389, filed May 7, 1970.

A desirable resilient polyurethane for use as a tread member is prepared by condensation and polymerization of a material having a plurality of active hydrogen groups with a material having a plurality of NCO groups. A wide variety of materials providing active hydrogen may be used; but it is preferred to use a mixture of diols and diamines. These are discussed in the aforementioned application Ser. No. 35,389.

The polyurethane material may be expanded to form the desired cellular product (the unitary sole/heel tread member in the illustrated embodiment of the invention) by the interaction of water with isocyanate to generate $CO_2$. Alternatively, volatile organic liquids such as methylene chloride, trichloromonofluoromethane and other volatile halogenated, preferably fluorine-containing organic liquids, may be used. When water is used, from 0.2 to 0.5 percent, preferably about 0.3 percent is used based on the weight of the resinous, e.g., diol, material. Where a volatile organic liquid is used, there will ordinarily be used from about 5 to about 7 parts by weight of the organic liquid based on 100 parts by weight of the resin material.

Any of the conventional catalyst systems may be used for insuring rapid and complete reaction of the components. A very satisfactory catalyst system is that shown in the U.S. Pat. No. 3,670,070, issued June 13, 1972 to Daniel Appleton, entitled "Processes for Molding Polyurethane Foam Articles." The disclosure of the above referred application is incorporated in the present application by reference.

The reactive components and volatile organic liquid, if used, are brought together and intimately mixed in measured relative quantities required for reaction and the mixture is discharged into the molding chamber 8. Apparatus for metering, mixing and dispensing a measured quantity of such multiple component mixtures to a plurality of molds is shown in U.S. Pat. No. 3,642,177 to Donald B. McIlvin. The portion of molding chamber 8 occurring within mold member 6 includes a bottom tread forming surface 10 and sole edge forming surfaces 12 with a mold sealing surface 14 extending outwardly from the sole edge forming surfaces 12. Top mold member 4 having a molding surface 16 with a formation to give an attaching surface 18 on the article to be molded has a mold sealing surface 20 extending outwardly therefrom for cooperation with the sealing surface 14 of mold member 6 to form the closed molding chamber 8.

The reactive mixture is introduced into the closed molding chamber 8 through a sprue 22 where it may react, as by foaming, to fill the space within the molding chamber 8. The general structure of the mold, and the method of making foamed polyurethane tread members therein thus far described, is known, and previously discussed in one or more of the previously listed patent applications.

In the illustrated embodiment, at least one of the mold members (bottom member 6 herein) is made of a heat resistant, resilient material such as a silicone rubber of the room temperature vulcanizing type. One example of this material is available from the Dow Chemical Company under the name Dow E RTV rubber. This type material is particularly effective for forming an effective seal at the parting line juncture of mold sealing surfaces 14 and 20. The irregular shape of the particular line of the illustrated mold is an inherent problem to casting of a unit sole/heel for women's shoes. Due to the resilience, low porosity, and heat expansion characteristics of the material chosen for mold member 6, an effective seal is accomplished readily which minimizes or eliminates flashing in this critical area. These inherent characteristics of the chosen mold material, while particularly beneficial in the above described respects, in the past have been considered offset by the complications they generate in the actual casting of the molded article. In order for the resilient, relatively nonporous material to become a satisfactory mold as illustrated, certain elaborate adaptations must be incorporated which are marked variations from conventional molding practice.

As may be seen in FIG. 1, and as further illustrated in FIGS. 2 and 3, passageways 26 run generally through mold member 6, opening into mold cavity 8 and venting to the outside of the mold member 6. In the illustrated embodiment, passages 26 generally open into cavity 8 at the juncture of tread forming surface 10 and edge forming surface 12. These passageways 26 form venting means to assist in the exhaustion of undesired gases from mold cavity 8. As mentioned above, as the reaction of the molding materials occurs and the article grows in the mold, air might be entrapped between the mold walls (surfaces 10 and 12) and the advancing expanding polyurethane material. Should pockets of gases develop as described, the advancing material will be prevented from fully filling mold cavity 8 and forming a completed unit sole/heel tread member.

To further facilitate the removal of these undesired gases, collection chambers 30 are disposed in the resilient mold member 6. These collection chambers 30 conveniently run along the juncture of surfaces 10 and 12, angularly extending therefrom. Passageways 26 open into chambers 30 to vent off the collected gases. In the illustrated embodiment, chambers 30 and passageways are disposed generally at locations corresponding to the foremost toe portion, rearmost heel portion and leading edges of the heel portion of the tread member. These locations have been found to be the likely areas wherein gases might be trapped in a mold for a unit sole/heel tread member fothe current style of women's shoes. It should be understood that the locations might be varied, both in position and number depending upon the relative shape of article cast and the orientation of the mold chamber in the molding apparatus.

Turning now to the other end of passageways 26, it should be noted that these open into chambers 28 located preferably in the side walls 32 of mold member 6. Chambers 28 are adapted to be coupled to means (represented by couple 34 in FIG. 1) for venting chamber 8 to the outside atmosphere around conventional molding apparatus. Preferably, the means for venting are also combinable with an air or other gas supply means (represented by a conduit 36 in FIG. 1) to provide a flow of air upon command of the molding apparatus, or operator therefor, behind the cast article to assist in removal of the cast article from the mold chamber 8.

Also, as a matter of preferance, a supply of mold release (well known in the art) may be connected to chamber 28, either individually or coordinated, with air supply 36. Such mold release supplies, in atomizer form, are well known in the art and are widely used in certain metallic mold installations. Inclusive of a mold release (such as the materials Karax or Vidax available from Contour Chemical Company or E. I. duPont de Nemours, respectively,) perhaps in atomized form in a charge of air will accomplish coating of chambers 30 and passageways 26 with mold release thereby facilitating removal of any polyurethane material collected therein during the molding process. It is well known to those familiar with the art that clogging of sprue ports by molding material renders the mold members unusable until such time as the ports are cleared. This is true also of vent passages in the illustrated embodiment since, if the vents can no longer perform their function, air or other gas entrapment may occur.

Referring now to FIGS. 2 through 5, the method of making the illustrated mold will be described. In the illustrated embodiment, mold member 6 is cast of the resilient, heat resistant, room temperature vulcanizing (RTV) rubbery material. To construct the mold member 6 with the previously described structural features, a model unit sole/heel tread member U (FIG. 2) is previously made up according to size and style features. Trim strips 40 complementary in shape to chamber 30 are affixed to unit U by means such as an adhesive well known in the art. Wire, cord, ribbon 42 or the like is attached to strips 40 to provide passageways 26 and is routed to one or more collection points such as plugs 44 which also represent means 28 for attaching vents and air/mold release supply means.

Unit U is then affixed by means known in the art on a parting board 48 having surface 50 representing the parting line and adapted to form sealing surface 14. Parting board 48 is then affixed with mold forming side walls 52 which also include means for locating plugs 44. Parting board 48, with end walls 52e attached (dotted), may then be filled with resilient room temperature vulcanizing rubbery material, which may then be hardened. The unit U and its attachments 40, 42, 44 may then be removed leaving a cast mold member 6 according to the above description. Within the scope of the invention, mold member 6 may be cast entirely of rubbery material, or partially thereof, to define the various surfaces 10, 12, 14 and in turn backed by a more rigid material such as epoxy or the like.

The preferred embodiment illustrated utilizes the "mother mold" principle (FIG. 3) wherein the mold member 6 containing the molding cavity 8 is cast in a second mold member 6' or "mother" mold. While mold member 6 is formed of a resilient RTV rubber, the member 6' may be of a structurally rigid material such as hard urethane, high temperature epoxy or a composition of metal chips such as aluminum bound together with an epoxy. The mother mold principle permits greater flexibility in molding operations and also reduces overall costs of molds. The inner member 6 may be readily changed should it become worn or some of the parts clogged. Likewise, a common size mold 6' may accommodate a variety of molds 6 formed to various shoe sizes or styles, greatly facilitating changer over of molding machines from size to size or style to style. Further, additional structural rigidity and uniform support of member 6 may be gained from the mother mold principle, thereby adding to the life of the individual mold member 6. Mother mold 6' may be placed directly over parting board 48 (FIG. 2) and member 6 cast directly therein by procedures known in the art.

Top mold member 4 may be formed in a manner similar to member 6. Conveniently, unit U is detached from parting board 48, still being encased in freshly cast member 6. The bottom members 6, 6' may be affixed with sides similar to 52 so that top member 4 may be formed or cast directly thereon, providing the exact attaching surface 18 desired. Also, tubular means 60 may be attached to unit U to form sprue 22. Since tread members formed of polyurethane material often require structural reinforcement, means 62 for attaching a shank S in top mold member 4 and heel plug P are included (see FIG. 1). Conventionally, holding means such as permanent magnets M are encased directly in a mold member at such locations as to hold a ferrous metal shank S in the desired location as illustrated. Locating pins 64 may also be included on mold member for shank/plug S/P by providing recesses in unit U. These pins 64 assist in the location of the shank S in the tread member molding process. Unit U could also be fitted to molding means such as a parting board similar to 48 and adapted to form sealing surface 20 (FIG. 1).

The built up unit U may then be molded in a manner similar to bottom unit 6 to form top member 4. In the illustrated embodiment, a high temperature epoxy is used to provide additional structural rigidity to the combined mold when members 4 and 6 are closed together for molding.

Referring now to FIGS. 2, 4 and 5, venting means for mold cavity 8 including passages 26 and chambers 30 include means 82 and 92 for limiting the back flow of polyurethane beyond the physical limits of mold cavity 8. This is important for at least two principal reasons; 1) minimizing the undesirable spew that would otherwise form in chambers 30 and passages 26; and 2) preventing the clogging of chambers 30 and passages for subsequent casts.

Chambers 30 (FIG. 1) are formed by attaching trim strips 40 to the unit U prior to casting bottom mold member 6 (FIGS. 2 and 5). Strips 40, in the illustrated embodiment, may be from about 0.001 inches to 0.005 inches in thickness and often extend about one-half inch to 1 inch into the mold member 6. The edge of strip 40, which is attached to unit U during construction of mold member 6, is preferably bevelled, as at 41 to a thickness of usually less than 0.001 inch so that when chamber 30 is formed, the opening 31 between chamber 30 and cavity 8 along the heel line is minimized. In practice, the entry 31 will appear to the observer merely as the contour line of the heel cavity to the naked eye. It is only upon foaming of the polyurethane during casting and the slightest pressure rise in cavity 8 that the entry 31 opens to vent to chamber 30. The opening during casting is usually slight (less than 0.001 inch) and the polyurethane in a fairly viscous condition does not flow through such a small space.

As a further precaution against backflow of polyurethane material into passage 26, restrictor means may be employed. Alternative forms of means (82 and 92) are illustrated in FIGS. 4 and 5. Referring to FIG. 4, a valve 82 of resilient material such as the previously mentioned RTV rubber may be made in advance of making of mold member 6. Valve 82 includes axial bores 84 extending from either ends toward (but not joining) the central region 86 of valve 82. A small passage 88 through central region 86 joining bores 84 provides a way for air to be vented from the cavity or to be blown back into cavity 8. Conveniently, valve 82 is molded as a unit with bores 84 integrally formed therein and passage 88 subsequently formed as by slitting with a knife or other sharp instrument. Valve 82 may be installed in mold member 6 by attaching it to wire 42 by their insertion in bores 84 during the build up of unit U prior to this being encased in the RTV as member 6 is cast.

Restrictor means 80 may also take the form of a narrow slit 90 in passage 26 as by providing a trim strip 92 (FIGS. 2 and 5) prior to encaging unit U in the RTV rubber while forming mold member 6. Trim strips 92 in the illustrated embodiment are conveniently about 0.001 inch in thickness and about ½ inch square. They may be conveniently attached to strips 40 and wires 42 by any of a variety of adhesives well known in the art.

Subsequent to encasing the built up unit U in RTV rubber in forming mold member 6, the various appendages strips 40, 92, wires 42, etc.) are carefully withdrawn leaving the passages 26 and chambers 30 free of obstruction. Member 6 may then be installed in a molding machine. Air venting valves and air and mold release supply means 36 may be attached to mold member 6 as generally indicated in FIG. 1. Polyurethane injection means (as that illustrated in U.S. Pat. No. 3,642,177 above referred to) from the above mentioned means may be attached to sprue means 22.

In operation, a predetermined shot of molding material is injected into cavity 8 of the mold with an attendant release of entrapped air through venting means coupled to passages 26. Further, as the polyurethane material grows (foams) to fill cavity 8, the remainder of entrapped air is vented through passages 26. Once solidification of the cast tread member takes place, the mold members 4 and 6 are opened in a conventional manner. Then, air supply means 36 may be activated to blow a predetermined amount of air back through passages 26 and chambers 30 into cavity 8. This blow back of air frees up "mini spews" which may form in chambers 30 and also floats the cast tread member out of cavity 8. Thus, the partial vacuum, which is normally generated behind an article formed in a resilient mold upon the article's being withdrawn from a mold, is released. Also, the usual wear or abrasion occurring during removal of the formed article against the forming surfaces 10 and 12 is minimized or eliminated since an air cushion is provided around the article prior to its being lifted from the mold 6.

As previously mentioned, a conventional mold release material such as in atomized form may be suspended in the air supply from means 36 to coat cavity 8 as well as passages 26 in preparation for a subsequent shot. Inclusion of the mold release also serves to further lubricate the adjacent surfaces of the cast article on mold surfaces (as at 10 and 12) to facilitate removal of the article and minimize sticking or abrasion.

Referring to FIG. 6, as previously mentioned, the invention may be embodied in a metal mold member 100 being a top member 102 and a bottom member 104, both being metallic, such as aluminum or an aluminum alloy. A molding cavity 106 is contained within the bottom tread forming surface 108 and sole edge forming surface 110. In this embodiment of the invention a portion 112 of one of the mold members is made of the previously mentioned resilient material, such as the heel tread forming surface. Venting means 114 is disposed therein including restrictor means 116 and conduit 118 leading to air supply means 120. As previously mentioned, restrictor means 116 consists of a narrow slot (about 0.002 inches in width) in said resilient material, preferably opening into a collection chamber 122, disposed between restrictor 116 and conduit 118. As with the previously described venting/restrictor means, during fill or expansion of the molding material, the pressure of the entrapped air against the resilient material in the region of the restrictor 116 causes the slit to open slightly and the entrapped air to escape. Since the slit is of a width less than that through which the viscous molding material can flow, the tread surface of the article formed is not deformed as by spew.

It should be apparent to those skilled in the art that various other adaptations may be made to the illustrated embodiments which are included within the spirit and scope of the invention hereinafter claimed. By way of example, the invention is disclosed as embodied in a mold having a member formed of heat resistant rubbery elastic material. The invention might also be embodied in other molds having all metal mold members with a barrel type restrictor of FIG. 4 disposed in the mold where a combined venting, blowback system was fled advantageous.

We claim:

1. Mold apparatus for casting an article of plastic material such as a unitary sole and heel tread member for a shoe comprising: A first mold member having therein wall structure forming a molding cavity; said wall structure having a vent opening formed therein; a second mold member cooperable with said first mold member to close said molding cavity for molding; means for supplying said plastic material to said mold cavity for molding; conduit means disposed in said first mold member extending from said opening into said molding cavity to externally of said molding member, and restrictor means disposed in said conduit for inhibiting the flow of molding material through said conduit and including a portion of said conduit formed of a heat resistant, resilient material having a deformable slot formed therein, said slot having a normal unpressurized minimum dimension which inhibits flow therethrough and said resilient material being effective to provide for increase in said slot minimum dimension under increased pressure in said conduit.

2. Mold apparatus according to claim 1 wherein said first mold member in the region defining said molding cavity is formed of a heat resistant, resilient material.

3. Mold apparatus according to claim 1 wherein said heat resistant, resilient material is a room temperature vulcanizing rubber.

4. Mold apparatus according to claim 1 wherein said normal unparessurized minimum dimension of said slot is in the area of 0.001 inches.

5. Mold apparatus according to claim 4 which further includes means connected to said conduit means externally of said molding member for supplying a pressurized fluid to said molding cavity.

6. Mold apparatus according to claim 1 which further includes means connected to said conduit means externally of said molding member for supplying a pressurized fluid to said molding cavity.

7. Mold apparatus according to claim 6 wherein said pressurized fluid comprises a combination of air and an atomized liquid for lubricating said mold.

* * * * *